No. 775,548. Patented November 22, 1904.

UNITED STATES PATENT OFFICE.

PAUL WEILLER, OF VIENNA, AND ARTHUR WEILLER, OF TRIESTE, AUSTRIA-HUNGARY.

PROCESS OF SEPARATING COPPER OR LIKE METALS FROM THEIR ORES.

SPECIFICATION forming part of Letters Patent No. 775,548, dated November 22, 1904.

Application filed April 12, 1904. Serial No. 202,829. (No specimens.)

*To all whom it may concern:*

Be it known that we, PAUL WEILLER, residing at Vienna, in the Province of Lower Austria, and ARTHUR WEILLER, residing at Trieste, in the district of Trieste, Empire of Austria-Hungary, subjects of the Emperor of Austria-Hungary, have invented certain new and useful Improvements in Processes of Separating Copper or Like Metals from Their Ores, of which the following is a specification.

This invention relates to a new or improved process for separating from their ores copper, silver, lead, mercury, and all other metals adapted to be precipitated from an acid solution by means of sulfureted hydrogen, the said process differing from the processes hitherto used for the purpose by the fact that it is performed without the use of coal and air-blast. The reducing agent and fuel for generating the high temperature required is metallic iron, the oxygen being supplied by means of a powerful oxidizing agent, which is added.

The advantage of the improved process over the processes hitherto known consists in the fact that pure metal is directly obtained by means of a single smelting operation without previous roasting, that it allows of treating very poor ores in a paying manner, and that the substances contained in the slag—such as, for instance, potassium and sodium hydroxid—can be extracted by means of lixiviation.

The process is performed in the following manner: The ore is crushed or broken up in the known manner and separated from the lode as thoroughly as possible, whereupon it is mixed with iron-filings and saltpeter. The proportions in which the mixture is made depend on the composition and nature of the ore. The ratio of the proportions of iron-filings to saltpeter is preferably as one to one; but if the ore contains combustible substances, such as iron sulfid or disulfid of iron the quantity of iron-filings must be proportionately more than that of saltpeter. The mixture is placed in a small furnace and ignited in the known manner. The metal is reduced and fused and descends by gravity to the sole of the hearth, whereupon it is run out or otherwise removed, according to the kind of furnace employed. If the ore requires a higher temperature or stronger oxidation for washing, then a chlorate is added to the mixture.

Having now described our invention, what we claim, and desire to secure by Letters Patent of the United States, is—

1. A process for separating from their ores copper, silver, lead, and all other metals adapted to be precipitated from an acid solution by means of sulfureted hydrogen, consisting in mixing the crushed ore with iron-filings and saltpeter, placing the mixture in a suitable small furnace and igniting the said mixture, whereby the metal is reduced and fused down, substantially as described and for the purpose set forth.

2. A process for separating from their ores copper, silver, lead, and all other metals adapted to be precipitated from an acid solution by means of sulfureted hydrogen, consisting in mixing the crushed ore with iron-filings, saltpeter, and a chlorate, placing the mixture in a suitable small furnace, igniting the said mixture and removing the metal, which is reduced and fused down, in suitable manner from the furnace, substantially as described and for the purpose set forth.

In witness whereof we have hereunto set our hands in presence of two witnesses.

PAUL WEILLER.
ARTHUR WEILLER.

Witnesses:
HANS PAPPENHEIM,
ALVESTO S. HOGUE.